3,692,710
CELLULAR PLASTICS OF POLYMERS OF
PERFLUOROLEFINS AND PROCESS FOR
MAKING THEM
Otfried Lörcher, Burghausen (Salzach), and Robert Steffen, Burgkirchen an der Altz, Germany, assignors to Farbwerke Hoechst Aktiengesellschaft vormals Meister Lucius & Bruning, Frankfurt am Main, Germany
No Drawing. Filed May 1, 1969, Ser. No. 828,070
Claims priority, application Germany, May 7, 1968,
P 17 69 315.1
Int. Cl. C08f 29/16, 47/08
U.S. Cl. 260—2.5 L                                   13 Claims

ABSTRACT OF THE DISCLOSURE

The present invention relates to cellular plastics of polymers of perfluorolefins and a process for making them by adding determined amounts of a hydroxyl substituted hydrocarbon containing at least three hydroxyl groups to the aqueous dispersion of the polymer and then whipping while introducing a gas and finally treating the stiff foam obtained at increasing temperatures. The cellular plastics have a unit weight within the range of from 70 to 1000 kg./m.$^3$ and a heat resistance of up to 250° C.

---

The present invention relates to cellular plastics of polymers of perfluorolefins and a process for making them.

Various processes have been proposed for the manufacture of cellular plastics of thermoplastic material. These processes mainly comprise adding a foaming agent to the thermoplastic material and decomposing said foaming agent at elevated temperature or treating the thermoplastic material with a gas serving as foaming agent as described, for example, in Swiss Pat. 294,345.

In the process described in British Pat. 756,555, polyvinyl chloride is first gelatinized and the water is then evaporated. To obtain a rigid foam of polyvinyl chloride it is necessary to introduce substances forming a framework, which remain, however, in the cellular plastic, thus influencing its quality.

These processes enable a number of cellular plastics to be obtained from various thermoplastic materials. However, it has not been possible so far to apply the known processes to the manufacture of cellular plastics of polytetrafluoroethylene and obtain technically useful products of this material which is interesting from many viewpoints.

The present invention provides a process for the manufacture of open-pore cellular plastics of polymers of perfluorolefins, mixtures of polymers of perfluorolefins or copolymers of perfluorolefins and optionally 1 to 20% by weight, calculated on the polymer, of a filler which comprises adding to an aqueous dispersion having a solids content of at least 50% by weight, preferably 60 to 75% by weight, of the said polymers or polymer mixtures, 3 to 10% by weight, calculated on the dispersion, of a hydroxyl substituted hydrocarbon containing at least three hydroxyl groups and which is volatile at a temperature below 300° C. and 0.8 to 15% by weight, calculated on the dispersion, of a known surface-active substance, and then introducing a gas, preferably air, while whipping, until a stiff foam is obtained which is subjected to a heat treatment at increasing temperatures, starting at about 80° C. and ending with sintering at a temperature within the range of from 330 to 450° C.

The process of the invention enables the manufacture of open-pore cellular plastics of polymers of perfluorolefins, mixtures of polymers of perfluorolefins or copolymers of perfluoroolefins, preferably polytetrafluorethylene, having a unit weight within the range of from 70 to 1000 kg./m.$^3$, preferably 70 to 200 kg./m.$^3$ and a heat resistance of up to 250° C.

It is advantageous to start from dispersions the polymer particles of which are as large as possible. To obtain as uniform an evaporation of the water as possible, hydroxyl substituted hydrocarbon containing at least three hydroxyl groups and which is volatile at a temperature below 300° C., preferably glycerol, cane sugar, sorbitol or glucose, is added to the dispersion. This hydroxyl substituted hydrocarbon, added in an amount of 3 to 10% by weight, preferably, 4 to 6% by weight, calculated on the dispersion, furthermore prevents the formation of hard crusts impermeable to water vapor at the surface of the foam.

As surface-active foam-forming substances, the substances customarily used for this purpose may be used. Examples of such substances are fat alcohol sulfonates, oxethylated sulfonated aliphatic or aromatic hydroxyl compounds, sulfosuccinic acid derivatives, for example, the sodium salt of the sulfosuccinic acid lauryl ethoxy semiester or the sodium salt of the sulfosuccinic acid semiester of fatty acid ethanolamides, triethanolamine derivatives, for example triethanolamine lauryl sulfate, alkylpolyglycol ethers, alkylamide polyglycol ethers in the form of their alkali metal-, alkaline earth metal-, ammonium- or oxalkylammonium salts. Advantageously, an aqueous solution of sulfonated lauryl alcohol oxethylate is used, preferably in a commercial concentration of 28%.

The foam is whipped in known manner by introducing a gas, preferably air, while stirring, until a creamy stiff consistency has been obtained.

The foam so obtained is subjected to a heat treatment at increasing temperatures, the foam being advantageously arranged in layers up to 30 millimeters thick. In the heat treatment, the water is removed at a temperature within the range of from about 80° to 150° C., while the substances containing OH groups and the foam-forming substances added to the latex escape at a temperature within the range of from 150° to about 300° C. so that a framework which has not yet solidified remains behind, which is sintered and thereby solidified at a temperature within the range of from 330° to 450° C. Any residues or decomposition products of the foam-forming agent are removed by burning at that temperature with the access of air, an open-pore cellular plastic being obtained.

The mechanical resistance of the celluar plastic can still be improved by adding to the dispersion 1 to 20% by weight, calculated on the polymer, of a filler, preferably glass fiber or water glass.

The process of the invention furthermore enables sandwich panels of particularly high strength to be obtained in a simple manner from cellular plastics of polytetrafluorethylene. When the foam which is still wet is dried and sintered on a plate or sheet of polytetrafluorethylene or on a metal plate or foil, it adheres so firmly to the support that the laminate cannot be separated without destruction of the cellular plastic. In this manner it is also possible to unite individual plates of cellular plastic to obtain thick plates or blocks. Because of the open pores of the cellular plastics the latter can be bonded with a large number of other materials, an excellent bond being obtained.

In further special modes of executing the process of the invention, the cellular plastics are combined, for example, with molded fiber boards, roofing felt or corrugated cardboard. The cellular plastics of the invention may be provided in known manner on one or both sides with a surface protection.

The cellular plastics of polyperfluoroolefins which can be obtained for the first time by the process of the invention have a number of properties that excel those of the known cellular plastics. Like polyperfluorolefins they are substantially insoluble and resistant to chemicals; they are white and, if desired, very soft and can still be used at temperatures of 250° C., whereas cellular plastics of polyvinyl chloride, for example, can only be used at temperatures up to about 80° C. because of their poorer thermostability under load. The cellular plastics of the invention may be used for many fields of application, particularly for cold, heat and sound insulation, as elastic packaging and storage materials and as filters for aggressive substances.

In the processing of polytetrafluorethylene by the known processes, the moulding material is generally pressed into a mould under high pressure and then sintered. The application of a high pressure is necessary because the individual particles of polytetrafluorethylene do not tend to flow even at a temperature above the softening point and coagulate only under pressure before or during sintering. It was therefore surprising that the latex which is not film-forming in itself, in spite of the large loss of weight caused by the removal of the water, of the substances containing hydroxyl groups and the foam-forming substances, yields a foam structure which can be made into a rigid foam by sintering without the application of pressure. It could not be foreseen, either, that the foam structure which has not yet solidified is not destroyed by the known 25% expansion of the polytetrafluorethylene when the latter enters the molten state.

The following examples serve to illustrate the invention, but are not intended to limit it.

EXAMPLE 1

20 grams of a 28% by weight aqueous solution of sulfonated lauryl alcohol oxethylate and 6 grams of glycerol were added to 100 grams of a dispersion containing 70% by weight of polytetrafluorethylene and the mixture was thoroughly whipped for 10 minutes with a hand mixer. The stiff foam was applied to a sheet of polytetrafluorethylene in a layer 30 millimeters thick and dried in a drying cabinet at a temperature within the range of from 90° to 150° C. The dried foam was then put in a muffle furnace, the temperature of which was raised from 150° to 400° C. The glycerol and the foam-forming agent were evaporated and the foam was kept at 400° C. for 30 minutes The cellular plastic so obtained was white, uniformly foamed and had a unit weight of 85 kg./m.$^3$

EXAMPLE 2

To the mixture used in Example 1, 5 grams of water glass were additionally added before foaming A slightly yellow cellular plastic was obtained which had a unit weight of 95 kg./m.$^3$, a more uniform pore structure and an improved compressive strength.

EXAMPLE 3

To the mixture used in Example 1, 5 grams of glass fiber were added and the whole was foamed. A cellular plastic having a unit weight of 130 kg./m.$^3$ and an improved compressive strength was obtained.

EXAMPLE 4

18 grams of a 28% by weight solution of sulfonated lauryl alcohol oxethylate and 3.5 grams of glycerol were added to 100 grams of a dispersion containing 60% by weight of polytetrafluorethylene, and the mixture was treated as described in Example 1. A white cellular plastic having a unit weight of 75 kg./m.$^3$ was obtained.

EXAMPLE 5

10 grams of a 50% by weight aqueous solution of triethanolamine lauryl sulfate and 6 grams of glycerol were added to 100 grams of a dispersion containing 70% by weight of polytetrafluorethylene and the mixture was foamed. The stiff foam was applied to an aluminum foil in a layer 25 millimeters thick and dried at a temperature within the range of from 95 to 150° C. The dried foam was freed from the organic substances added in a muffle furnace at 350° C. and sintered and then annealed at 400° C. for 1 hour. A white cellular plastic having a unit weight of 83 kg./m.$^3$ was obtained. The aluminum foil could not be removed without breaking the cellular plastic.

EXAMPLE 6

The process was carried out as described in Example 1, but while adding, instead of glycerol, 3.5 grams of d-sorbitol. A white cellular plastic having a unit weight of 90 kg./m.$^3$ was obtained.

EXAMPLE 7

The process was carried out as described in Example 1, but while using, instead of glycerol, 3.5 grams of d-glucose. A cellular plastic having a unit weight of 83 kg./m.$^3$ was obtained.

EXAMPLE 8

8 grams of a 40% by weight solution of the sodium salt of sulfosuccinic acid lauryl ethoxy semiester and 6 grams of glycerol were added to 100 grams of a dispersion containing 70% by weight of polytetrafluorethylene. The mixture was foamed as described in Example 1. A cellular plastic having a unit weight of 100 kg./m.$^3$ obtained.

What is claimed is:

1. An open-pore cellular polytetrafluoroethylene having a unit weight within the range of from 70 to 200 kg./m.$^3$ and a heat resistance up to 250° C.

2. The cellular polytetrafluoroethylene of claim 1 which is coated on one side with a sheet of polytetrafluorethylene or with a metal foil.

3. The cellular polytetrafluoroethylene as claimed in claim 1 containing 1 to 20% by weight, based on the polytetrafluoroethylene, of a filler.

4. The cellular polytetrafluoroethylene as claimed in claim 3 containing from 1 to 20% by weight, calculated on polyetetrafluoroethylene, of glass fiber.

5. The cellular polytetrafluoroethylene as claimed in claim 3 containing from 1 to 20% by weight, calculated on polytetrafluoroethylene, of water glass.

6. In the process for the manufacture of open-pore cellular polytetrafluoroethylene, the improvement which comprises adding to an aqueous dispersion having a solids content of at least 50% by weight of the said polytetrafluoroethylene, 3 to 10% by weight, calculated on the dispersion, of a hydroxyl substituted hydrocarbon containing at least three hydroxyl groups which is volatile at a temperature below 300° C. and 0.8 to 15% by weight, calculated on the dispersion, of a surface-active substance, introducing a gas into the dispersion, while whipping, until a stiff foam is obtained and subjecting the foam to a heat treatment at increasing temperatures, said heat treatment starting at a temperature of about 80° C. and ending with sintering at a temperature within the range of from 330° to 450° C.

7. The process of claim 6 wherein 1 to 20% by weight, based on polytetrafluoroethylene, of filler is added to the dispersion.

8. The process of claim 6 wherein a dispersion having a solids content of 60 to 75% by weight is used.

9. The process of claim 6 wherein 4 to 6% by weight of the hydroxyl substituted hydrocarbon is added to the dispersion, the percentage figures being calculated on the the dispersion.

10. The process of claim 6 wherein the hydroxyl substituted hydrocarbon is glycerol, cane sugar, sorbitol or glucose.

11. The process of claim 6 wherein air is introduced into the dispersion while whipping.

12. The process of claim 6 wherein the stiff foam is applied to a sheet or plate of polytetrafluoroethylene or a metal plate or foil and thereafter subjected to the heat treatment.

13. The process of claim 7 wherein the filler is glass fiber or water glass.

References Cited

UNITED STATES PATENTS

| | | | |
|---|---|---|---|
| 2,997,448 | 8/1961 | Hochberg | 260—2.5 M |
| 3,038,870 | 6/1962 | Schott | 260—29.6 F |
| 3,058,166 | 10/1962 | Fields | 264—54 |
| 3,322,710 | 5/1967 | McWhorter et al. | 260—29.3 |
| 3,556,161 | 1/1971 | Roberts | 260—2.5 M |
| 3,639,297 | 2/1972 | Steffen et al. | 260—2.5 L |

MURRAY TILLMAN, Primary Examiner

W. J. BRIGGS, SR., Assistant Examiner

U.S. Cl. X.R.

260—2.5 M, 29.6 F, 41 R, 41 AG, 92.1; 264—50